US008329783B2

(12) United States Patent
Nair et al.

(10) Patent No.: US 8,329,783 B2

(45) Date of Patent: *Dec. 11, 2012

(54) TONER POROUS PARTICLES CONTAINING HYDROCOLLOIDS

(75) Inventors: Mridula Nair, Penfield, NY (US); Xiqiang Yang, Webster, NY (US); Tamara K. Jones, Rochester, NY (US); Jason Morgan, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/961,559

(22) Filed: Dec. 7, 2010

(65) Prior Publication Data

US 2011/0123920 A1 May 26, 2011

Related U.S. Application Data

(63) Continuation of application No. 11/624,252, filed on Jan. 18, 2007, now Pat. No. 7,887,984.

(51) Int. Cl.
*C08J 3/03* (2006.01)

(52) U.S. Cl. ..... 523/339; 523/333; 523/440; 430/110.1; 430/109.1; 430/109.3; 430/109.4; 430/108.1; 430/137.17

(58) Field of Classification Search ............... 430/110.1, 430/109.1, 109.3, 109.4, 108.1, 137.17; 523/333, 523/339, 440

See application file for complete search history.

(56) References Cited

U.S. PATENT DOCUMENTS

| | | | | |
|---|---|---|---|---|
| 3,923,704 | A | 12/1975 | Gunning et al. | |
| 3,979,342 | A * | 9/1976 | Baidins et al. | 521/162 |
| 4,254,201 | A | 3/1981 | Sawai et al. | |
| 4,339,237 | A | 7/1982 | Wang et al. | |
| 4,461,849 | A | 7/1984 | Karickhoff | |
| 4,489,174 | A | 12/1984 | Karickhoff | |
| 4,833,060 | A | 5/1989 | Nair et al. | |
| 4,965,131 | A | 10/1990 | Nair et al. | |
| 5,583,162 | A | 12/1996 | Li et al. | |
| 5,653,922 | A | 8/1997 | Li et al. | |
| 5,760,097 | A | 6/1998 | Li et al. | |
| 5,863,957 | A | 1/1999 | Li et al. | |
| 5,902,834 | A | 5/1999 | Porrvik | |
| 6,100,306 | A | 8/2000 | Li et al. | |
| 6,171,743 | B1 | 1/2001 | Nakamura | |
| 6,572,894 | B2 | 6/2003 | Rossling et al. | |
| 7,041,420 | B2 | 5/2006 | Vandewinckel et al. | |
| 7,252,842 | B2 | 8/2007 | Albayrak | |
| 7,501,179 | B2 | 3/2009 | Song et al. | |
| 7,754,409 | B2 | 7/2010 | Nair et al. | |
| 2003/0054280 | A1 | 3/2003 | Ishihara et al. | |
| 2003/0087176 | A1 * | 5/2003 | Ezenyilimba et al. | 430/137.14 |
| 2003/0138608 | A1 | 7/2003 | Landry-Coltrain et al. | |
| 2003/0215394 | A1 | 11/2003 | Short et al. | |
| 2005/0026064 | A1 | 2/2005 | Sugiura et al. | |
| 2006/0263590 | A1 | 11/2006 | Cheng et al. | |

(Continued)

FOREIGN PATENT DOCUMENTS

| | | |
|---|---|---|
| EP | 0 083 188 | 7/1983 |
| EP | 0 467 528 | 12/1996 |

*Primary Examiner* — Peter Vajda

(74) *Attorney, Agent, or Firm* — Andrew J. Anderson

(57) ABSTRACT

The present invention is toner particle that includes a continuous phase of binder polymer and a second phase of hydrocolloid. The particle has a porosity of at least 10 percent.

20 Claims, 4 Drawing Sheets

U.S. PATENT DOCUMENTS

2007/0141501 A1 6/2007 Jin et al.
2008/0176164 A1 7/2008 Nair et al.
2008/0268363 A1 10/2008 Nair et al.
2008/0268367 A1 10/2008 Nair et al.
2009/0098288 A1 4/2009 Massa et al.
2009/0098382 A1 4/2009 Massa et al.

* cited by examiner

Unfused

Fused

Unfused

Fused

TONER POROUS PARTICLES CONTAINING HYDROCOLLOIDS

CROSS-REFERENCE TO RELATED APPLICATIONS

This is a continuation of application Ser. No. 11/624,252, Filed Jan. 18, 2007 now U.S. Pat. No. 7,887,984, which is hereby incorporated herein by reference in its entirety.

This application relates to commonly assigned application Ser. No. 11/624,335, entitled "Toner Manufacturing Method," now issued as U.S. Pat. No. 7,754,409, Jul. 13, 2010, and hereby incorporated by reference for all that it discloses.

FIELD OF THE INVENTION

This invention relates to novel particles having improved properties, and more particularly, to toner particles having an elevated porosity.

BACKGROUND OF THE INVENTION

Conventional electrostatographic toner powders are made up of a binder polymer and other ingredients, such as pigment and a charge control agent, that are melt blended on a heated roll or in an extruder. The resulting solidified blend is then ground or pulverized to form a powder. Inherent in this conventional process are certain drawbacks. For example, the binder polymer must be brittle to facilitate grinding. Improved grinding can be achieved at lower molecular weight of the polymeric binder. However, low molecular weight binders have several disadvantages; they tend to form toner/developer flakes; they promote scumming of the carrier particles that are admixed with the toner powder for electrophotographic developer compositions; their low melt elasticity increases the off-set of toner to the hot fuser rollers of the electrophotographic copying apparatus, and the glass transition temperature (Tg) of the binder polymer is difficult to control. In addition, grinding of the polymer results in a wide particle size distribution. Consequently, the yield of useful toner is lower and manufacturing cost is higher. Also the toner fines accumulate in the developer station of the copying apparatus and adversely affect the developer life.

The preparation of toner polymer powders from a preformed polymer by the chemically prepared toner process such as the "Evaporative Limited Coalescence" (ELC) offers many advantages over the conventional grinding method of producing toner particles. In this process, polymer particles having a narrow size distribution are obtained by forming a solution of a polymer in a solvent that is immiscible with water, dispersing the solution so formed in an aqueous medium containing a solid colloidal stabilizer and removing the solvent. The resultant particles are then isolated, washed and dried.

In the practice of this technique, polymer particles are prepared from any type of polymer that is soluble in a solvent that is immiscible with water. Thus, the size and size distribution of the resulting particles can be predetermined and controlled by the relative quantities of the particular polymer employed, the solvent, the quantity and size of the water insoluble solid particulate suspension stabilizer, typically silica or latex, and the size to which the solvent-polymer droplets are reduced by mechanical shearing using rotor-stator type colloid mills, high pressure homogenizers, agitation etc.

Limited coalescence techniques of this type have been described in numerous patents pertaining to the preparation of electrostatic toner particles because such techniques typically result in the formation of polymer particles having a substantially uniform size distribution. Representative limited coalescence processes employed in toner preparation are described in U.S. Pat. Nos. 4,833,060 and 4,965,131 to Nair et al., incorporated herein by reference for all that they contain.

This technique includes the following steps: mixing a polymer material, a solvent and optionally a colorant and a charge control agent to form an organic phase; dispersing the organic phase in an aqueous phase comprising a particulate stabilizer and homogenizing the mixture; evaporating the solvent and washing and drying the resultant product.

There is a need to reduce the amount of toner applied to a substrate in the Electrophotographic Process (EP). Porous toner particles in the electrophotographic process can potentially reduce the toner mass in the image area. Simplistically, a toner particle with 50% porosity should require only half as much mass to accomplish the same imaging results. Hence, toner particles having an elevated porosity will lower the cost per page and decrease the stack height of the print as well. The application of porous toners provides a practical approach to reduce the cost of the print and improve the print quality.

U.S. Pat. Nos. 3,923,704, 4339,237, 4461,849, 4,489,174 and EP 0083188 discuss the preparation of multiple emulsions by mixing a first emulsion in a second aqueous phase to form polymer beads. These processes produce porous polymer particles having a large size distribution with little control over the porosity. This is not suitable for toner particles.

U.S. Publication No. 2005/0026064 describes a porous toner particle. However control of particle size distribution along with the even distribution of pores throughout the particle is a problem. The present invention solves these problems and provides a less complex method to manufacture porous particles.

An object of the present invention is to provide a toner particle with increased porosity.

A further object of the present invention is to provide a toner particle with a narrow size distribution.

A still further object of the present invention is to provide a process that produces particles reproducibly and having a narrow size distribution.

SUMMARY OF THE INVENTION

The present invention is toner particle that includes a continuous phase of binder polymer and a second phase of hydrocolloid. The particle has a porosity of at least 10 percent.

Figure 1:
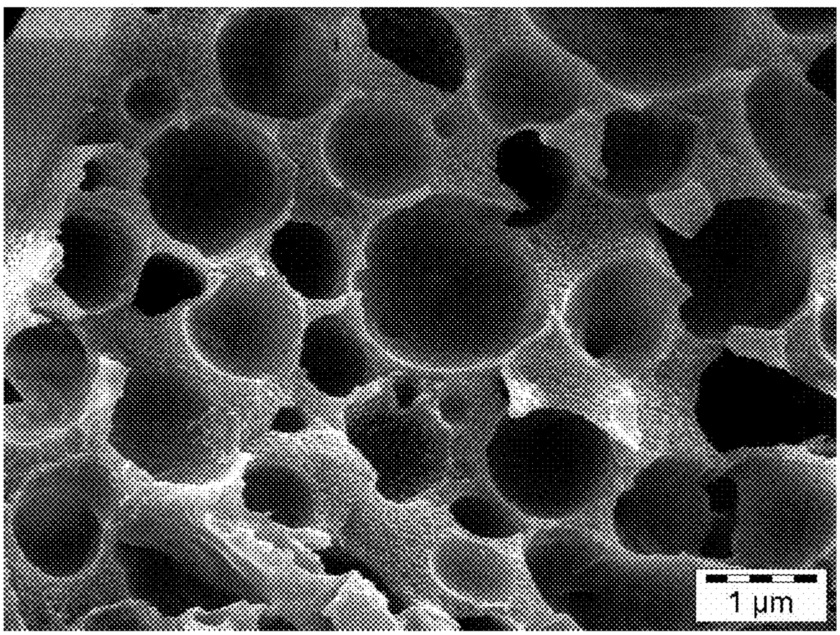
FIG. 1 is a Scanning Electron Microscope (SEM) image cross sectional image of a toner particle in accordance with the present invention.

For a better understanding of the present invention together with other advantages and capabilities thereof, reference is made to the following description and appended claims in connection with the preceding drawings.

DETAILED DESCRIPTION OF THE INVENTION

The use of porous toner particles in the electrophotographic process will reduce the toner mass in the image area. For example toner particles with 50% porosity should require only half as much mass to accomplish the same imaging results. Hence, toner particles having an elevated porosity will lower the cost per page and decrease the stack height of the print as well. The porous toner technology of the present invention provides a thinner image so as to improve the image quality, reduce curl, reduce image relief, save fusing energy and feel/look more close to offset printing rather than typical EP printing. In addition, colored porous particles of the present invention will narrow the cost gap between color and monochrome prints. Those potentials are expected to expand the EP process to broader application areas and promote more business opportunities for EP technology.

Porous polymer beads are used in various applications, such as chromatographic columns, ion exchange and adsorption resins, as drug delivery vehicles, scaffolds for tissue engineering, in cosmetic formulations, and in the paper and paint industries. The methods for generating pores inside polymer particles are known in the field of polymer science. However, due to the specific requirements for the toner binder materials, such as suitable glass transition temperatures, crosslinking density and rheology, and sensitivity to particle brittleness that comes from enhanced porosity, the preparation of porous toners is not straightforward. In the present invention, porous particles are prepared using a multiple emulsion process, in conjunction with a suspension process, particularly, the ELC process.

The porous particles of the present invention include "micro", "meso" and "macro" pores which according to the International Union of Pure and Applied Chemistry are the classifications recommended for pores less than 2 nm, 2 to 50 nm, and greater than 50 nm respectively. The term porous particles will be used herein to include pores of all sizes, including open or closed pores.

The process for making the porous particles of this invention involves basically a three-step process. The first step involves the formation of a stable water-in-oil emulsion, including a first aqueous solution of a pore stabilizing hydrocolloid dispersed finely in a continuous phase of a binder polymer dissolved in an organic solvent. This first water phase creates the pores in the particles of this invention and the pore stabilizing compound controls the pore size and number of pores in the particle, while stabilizing the pores such that the final particle is not brittle or fractured easily.

In the practice of this invention, suitable pore stabilizing hydrocolloids include both naturally occurring and synthetic, water-soluble or water-swellable polymers such as, cellulose derivatives eg., Carboxymethyl Cellulose (CMC) also referred to as sodium carboxy methyl cellulose, gelatin eg., alkali-treated gelatin such as cattle bone or hide gelatin, or acid treated gelatin such as pigskin gelatin, gelatin derivatives eg., acetylated gelatin, phthalated gelatin, and the like, substances such as proteins and protein derivatives, synthetic polymeric binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, water soluble microgels, polyelectrolytes and mixtures thereof.

In order to stabilize the initial first step water-in-oil emulsion so that it can be held without ripening or coalescence, if desired, it is preferable that the hydrocolloid in the water phase have a higher osmotic pressure than that of the binder in the oil phase depending on the solubility of water in the oil. This dramatically reduces the diffusion of water into the oil phase and thus the ripening caused by migration of water between the water droplets. One can achieve a high osmotic pressure in the water phase either by increasing the concentration of the hydrocolloid or by increasing the charge on the hydrocolloid (the counter-ions of the dissociated charges on the hydrocolloid increase the osmotic pressure of the hydrocolloid). It can be advantageous to have weak base or weak acid moieties in the pore stabilizing hydrocolloid that allow for the osmotic pressure of the hydrocolloid to be controlled by changing the pH. We will call these hydrocolloids "weakly dissociating hydrocolloids". For these weakly dissociating hydrocolloids the osmotic pressure can be increased by buffering the pH to favor dissociation, or by simply adding a base (or acid) to change the pH of the water phase to favor dissociation. A preferred example of such a weakly dissociating hydrocolloid is CMC that has a pH sensitive dissociation (the carboxylate is a weak acid moiety). For CMC the osmotic pressure can be increased by buffering the pH, for example using a pH 6-8 phosphate buffer, or by simply adding a base to raise the pH of the water phase to favor dissociation (for CMC the osmotic pressure increases rapidly as the pH is increased from 4-8). Other synthetic polyelectrolytes hydrocolloids such as polystyrene sulphonate (PSS) or poly(2-acrylamido-2-methylpropanesulfonate) (PAMS) or polyphosphates are also possible hydrocolloids. These hydrocolloids have strongly dissociating moieties. While the pH control of osmotic pressure that can be advantageous, as described above, is not possible due to the strong dissociation of charges for these strongly dissociating polyelectrolyte hydrocolloids, these systems will be insensitive to varying level of acid impurities. This is a potential advantage for these strongly dissociating polyelectrolyte hydrocolloids particularly when used with binder polymers that have varying levels of acid impurities such as polyesters.

The essential properties of the pore stabilizing hydrocolloids are solubility in water, no negative impact on multiple emulsification process, and no negative impact on melt rheology of the resulting particles when they are used as electrostatographic toners. The pore stabilizing compounds can be optionally crosslinked in the pore to minimize migration of the compound to the surface affecting triboelectrification of the toners. The amount of the hydrocolloid used in the first step will depend on the amount of porosity and size of pores desired and the molecular weight of the hydrocolloid. A particularly preferred hydrocolloid is CMC and in an amount of from 0.5-20 weight percent of the binder polymer, preferably in an amount of from 1-10 weight percent of the binder polymer.

The first aqueous phase may additionally contain, if desired, salts to buffer the solution and to optionally control the osmotic pressure of the first aqueous phase as described earlier. For CMC the osmotic pressure can be increased by buffering using a pH7 phosphate buffer. It may also contain additional porogen or pore forming agents such as ammonium carbonate.

As indicated above, the present invention is applicable to the preparation of polymeric particles from any type of binder polymer or binder resin that is capable of being dissolved in a solvent that is immiscible with water wherein the binder itself is substantially insoluble in water. Useful binder polymers include those derived from vinyl monomers, such as styrene monomers, and condensation monomers such as esters and mixtures thereof. As the binder polymer, known binder resins are useable. Concretely, these binder resins include homopolymers and copolymers such as polyesters, styrenes, e.g. styrene and chlorostyrene; monoolefins, e.g. ethylene, propylene, butylene and isoprene; vinyl esters, e.g. vinyl acetate, vinyl propionate, vinyl benzoate and vinyl butyrate; α-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone. Particularly desirable binder polymers/resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. Also, especially useful are polyesters of aromatic or aliphatic dicarboxylic acids with one or more aliphatic dials, such as polyesters of isophthalic or terephthalic or fumaric acid with diols such as ethylene glycol, cyclohexane dimethanol and bisphenol adducts of ethylene or propylene oxides.

Preferably the acid values (expressed as milligrams of potassium hydroxide per gram of resin) of the polyester resins are in the range of 2-100. The polyesters may be saturated or unsaturated. Of these resins, styrene/acryl and polyester resins are particularly preferable.

In the practice of this invention, it is particularly advantageous to utilize resins having a viscosity in the range of 1 to 100 centipoise when measured as a 20 weight percent solution in ethyl acetate at 25° C.

Any suitable solvent that will dissolve the binder polymer and which is also immiscible with water may be used in the practice of this invention such as for example, chloromethane, dichloromethane, ethyl acetate, vinyl chloride, trichloromethane, carbon tetrachloride, ethylene chloride, trichloroethane, toluene, xylene, cyclohexanone, 2-nitropropane and the like. A particularly useful solvent in the practice of this invention are ethyl acetate and propyl acetate for the reason that they are both good solvents for many polymers while at the same time being sparingly soluble in water. Further, their volatility is such that they are readily removed from the discontinuous phase droplets as described below, by evaporation.

Optionally, the solvent that will dissolve the binder polymer and which is immiscible with water may be a mixture of two or more water-immiscible solvents chosen from the list given above. Optionally the solvent may comprise a mixture of one or more of the above solvents and a water-immiscible nonsolvent for the binder polymer such as heptane, cyclohexane, diethylether and the like, that is added in a proportion that is insufficient to precipitate the binder polymer prior to drying and isolation.

Various additives generally present in electrostatograhic toner may be added to the binder polymer prior to dissolution in the solvent, or after the dissolution step itself, such as colorants, charge control agents, and release agents such as waxes and lubricants.

Colorants, a pigment or dye, suitable for use in the practice of the present invention are disclosed, for example, in U.S. Reissue Patent 31,072 and in U.S. Pat. Nos. 4,160,644; 4,416,965; 4,414,152 and 2,229,513. As the colorants, known colorants can be used. The colorants include, for example, carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3. Colorants can generally be employed in the range of from about 1 to about 90 weight percent on a total toner powder weight basis, and preferably in the range of about 2 to about 20 weight percent, and most preferably from 4 to 15 weight percent in the practice of this invention. When the colorant content is 4% or more by weight, a sufficient coloring power can be obtained, and when it is 15% or less by weight, good transparency can be obtained. Mixtures of colorants can also be used. Colorants in any form such as dry powder, its aqueous or oil dispersions or wet cake can be used in the present invention. Colorant milled by any methods like media-mill or ball-mill can be used as well. The colorant may be incorporated in the oil phase or in the first aqueous phase.

The release agents preferably used herein are waxes. Concretely, the releasing agents usable herein are low-molecular weight polyolefins such as polyethylene, polypropylene and polybutene; silicone resins which can be softened by heating; fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products thereof. When a wax containing a wax ester having a high polarity, such as carnauba wax or candelilla wax, is used as the releasing agent, the amount of the wax exposed to the toner particle surface is inclined to be large. On the contrary, when a wax having a low polarity such as polyethylene wax or paraffin wax is used, the amount of the wax exposed to the toner particle surface is inclined to be small.

Irrespective of the amount of the wax inclined to be exposed to the toner particle surface, waxes having a melting point in the range of 30 to 150° C. are preferred and those having a melting point in the range of 40 to 140° C. are more preferred.

The wax is, for example, 0.1 to 20% by mass, and preferably 0.5 to 8% by mass, based on the toner.

The term "charge control" refers to a propensity of a toner addendum to modify the triboelectric charging properties of the resulting toner. A very wide variety of charge control agents for positive charging toners are available. A large, but lesser number of charge control agents for negative charging toners, is also available. Suitable charge control agents are disclosed, for example, in U.S. Pat. Nos. 3,893,935; 4,079,014; 4,323,634; 4,394,430 and British Patents 1,501,065; and 1,420,839. Charge control agents are generally employed in small quantities such as, from about 0.1 to about 5 weight percent based upon the weight of the toner. Additional charge control agents that are useful are described in U.S. Pat. Nos. 4,624,907; 4,814,250; 4,840,864; 4,834,920; 4,683,188 and 4,780,553. Mixtures of charge control agents can also be used.

The second step in the formation of the porous particles of this invention involves forming a water-in-oil-in-water emulsion by dispersing the above mentioned water-in-oil emulsion in a second aqueous phase containing either stabilizer polymers such as poylvinylpyrrolidone or polyvinylalchol or more preferably colloidal silica such as LUDOX™ or NALCO™ or latex particles in a modified ELC process described in U.S. Pat. Nos. 4,883,060; 4,965,131; 2,934,530; 3,615,972; 2,932,629 and 4,314,932, the disclosures of which are hereby incorporated by reference.

Specifically, in the second step of the process of the present invention, the water-in-oil emulsion is mixed with the second aqueous phase containing colloidal silica stabilizer to form an aqueous suspension of droplets that is subjected to shear or extensional mixing or similar flow processes, preferably through an orifice device to reduce the droplet size, yet above the particle size of the first water-in-oil emulsion, and achieve narrow size distribution droplets through the limited coalescence process. The pH of the second aqueous phase is generally between 4 and 7 when using silica as the colloidal stabilizer.

The suspension droplets of the first water-in-oil emulsion in the second aqueous phase, results in droplets of binder polymer/resin dissolved in oil containing the first aqueous phase as finer droplets within the bigger binder polymer/resin droplets, which upon drying produces porous domains in the resultant particles of binder polymer/resin as shows in FIG. 1. The actual amount of silica used for stabilizing the droplets depends on the size of the final porous particle desired as with a typical limited coalescence process, which in turn depends on the volume and weight ratios of the various phases used for making the multiple emulsion.

Any type of mixing and shearing equipment may be used to perform the first step of this invention, such as a batch mixer, planetary mixer, single or multiple screw extruder, dynamic or static mixer, colloid mill, high pressure homogenizer, sonicator, or a combination thereof. While any high shear type agitation device is applicable to this step of the present invention, a preferred homogenizing device is the MICROFLUIDIZER such as Model No. 110T produced by Microfluidics Manufacturing. In this device, the droplets of the first water phase (discontinuous phase) are dispersed and reduced in size in the oil phase (continuous phase) in a high shear agitation zone and, upon exiting this zone, the particle size of the dispersed oil is reduced to uniform sized dispersed droplets in the continuous phase. The temperature of the process can be modified to achieve the optimum viscosity for emulsification of the droplets and to control evaporation of the solvent. For the second step, where the water-in-oil-in-water emulsion is formed the shear or extensional mixing or flow process is controlled in order to prevent disruption of the first emulsion and droplet size reduction is achieved by homogenizing the emulsion through a capillary orifice device, or other suitable flow geometry. In the method of this invention, the range of back pressure suitable for producing acceptable particle size and size distribution is between 100 and 5000 psi, preferably between 500 and 3000 psi. The preferable flow rate is between 1000 and 6000 mL per minute.

The final size of the particle, the final size of the pores and the surface morphology of the particle may be impacted by the osmotic mismatch between the osmotic pressure of the inner water phase, the binder polymer/resin oil phase and the outer water phase. At each interface, the larger the osmotic pressure gradient present, the faster the diffusion rate where water will diffuse from the lower osmotic pressure phase to the higher osmotic pressure phase depending on the solubility and diffusion coefficient of the water in oil phase. If either the exterior water phase or the interior water phase has an osmotic pressure less than the oil phase then water will diffuse into and saturate the oil phase. For the preferred oil phase solvent of ethyl acetate this can result in approximately 8% by weight water dissolved in the oil phase. If the osmotic pressure of the exterior water phase is higher than the binder phase then the water will migrate out of the pores of the particle and reduce the porosity and particle size. In order to maximize porosity one preferably orders the osmotic pressures so that the osmotic pressure of the outer phase is lowest, while the osmotic pressure of the interior water phase is highest. Thus, the water will diffuse following the osmotic gradient from the external water phase into the oil phase and then into the internal water phase swelling the size of the pores and increasing the porosity and particle size.

If it is desirable to have small pores and maintain the initial small drop size formed in the step one emulsion then the osmotic pressure of both the interior and exterior water phase should be preferably matched, or have a small osmotic pressure gradient. It is also preferable that the osmotic pressure of the exterior and interior water phases be higher than the oil phase. When using weakly dissociating hydrocolloids such as CMC, one can change the pH of the exterior water phase using acid or a buffer preferably a pH 4 citrate buffer. The hydrogen and hydroxide ions diffuse rapidly into the interior water phase and equilibrate the pH with the exterior phase. The drop in pH of the interior water phase containing the CMC thus reduces the osmotic pressure of the CMC. By designing the equilibrated pH correctly one can control the hydrocolloid osmotic pressure and thus the final porosity, size of the pores and particle size.

A way to control the surface morphology as to whether there are open pores (surface craters) or closed pores (a surface shell) is by controlling the osmotic pressure of the two water phases. If the osmotic pressure of the interior water phase is sufficiently low relative to the exterior water phase the pores near the surface may burst to the surface and create an "open pore" surface morphology during drying in the third step of the process.

The third step in the preparation of the porous particles of this invention involves removal of both the solvent that is used to dissolve the binder polymer and most of the first water phase so as to produce a suspension of uniform porous polymer particles in aqueous solution. The rate, temperature and pressure during drying will also impact the final particle size and surface morphology. Clearly the details of the importance of this process depend on the water solubility and boiling point of the organic phase relative to the temperature of drying process. Solvent removal apparatus such as a rotary evaporator or a flash evaporator may be used in the practice of the method of this invention. The polymer particles are isolated after removing the solvent by filtration or centrifugation, followed by drying in an oven at 40° C. that also removes any water remaining in the pores from the first water phase. Optionally, the particles are treated with alkali to remove the silica stabilizer.

Optionally, the third step in the preparation of porous particles described above may be preceded by the addition of additional water prior to removal of the solvent, isolation and drying.

The average particle diameter of the porous toner of the present invention is, for example, 2 to 50 micrometers, preferably 3 to 20 micrometers.

The porosity of the particles is greater than 10%, preferably between 20 and 90% and most preferably between 30 and 70%.

Alternatively, in the process of the present invention, the pore stabilizing hydrocolloid may be emulsified in a mixture of water-immiscible polymerizable monomers, a polymerization initiator and optionally a colorant and a charge control agent to form the first water in oil emulsion. The resulting emulsion may then be dispersed in water containing stabilizer as described in the second step of the process to form a water-in-oil-in-water emulsion preferably through the limited coalescence process. The monomers in the emulsified mixture are polymerized in the third step, preferably through the application of heat or radiation. The resulting suspension polymerized particles may be isolated and dried as described earlier to yield porous particles. In addition the mixture of water-immiscible polymerizable monomers can contain the binder polymers listed previously.

The shape of the toner particles has a bearing on the electrostatic toner transfer and cleaning properties. Thus, for example, the transfer and cleaning efficiency of toner particles have been found to improve as the sphericity of the particles are reduced. A number of procedures to control the shape of toner particles are know in the art. In the practice of this invention, additives may be employed in the second water phase or in the oil phase if necessary. The additives may be added after or prior to forming the water-in-oil-in-water emulsion. In either case the interfacial tension is modified as the solvent is removed resulting in a reduction in sphericity of the particles. U.S. Pat. No. 5,283,151 describes the use of carnauba wax to achieve a reduction in sphericity of the particles. US Publication No. 2008/0145779 entitled "Toner Particles of Controlled Surface Morphology and Method of Preparation" describes the use of certain metal carbamates that are useful to control sphericity and US Publication No. 2008/0145780 entitled "Chemically Prepared Toner Particles with Controlled Shape" describes the use of specific salts to control sphericity. US Publication No. 2007/0298346 entitled "Toner Particles of Controlled Morphology" describes the use of quaternary ammonium tetraphenylborate salts to control sphericity. These applications are incorporated by reference herein.

Toner particles of the present invention may also contain flow aids in the form of surface treatments. Surface treatments are typically in the form of inorganic oxides or polymeric powders with typical particle sizes of 5 nm to 1000 nm. With respect to the surface treatment agent also known as a spacing agent, the amount of the agent on the toner particles is an amount sufficient to permit the toner particles to be stripped from the carrier particles in a two component system by the electrostatic forces associated with the charged image or by mechanical forces. Preferred amounts of the spacing agent are from about 0.05 to about 10 weight percent, and most preferably from about 0.1 to about 5 weight percent, based on the weight of the toner.

The spacing agent can be applied onto the surfaces of the toner particles by conventional surface treatment techniques such as, but not limited to, conventional powder mixing techniques, such as tumbling the toner particles in the presence of the spacing agent. Preferably, the spacing agent is distributed on the surface of the toner particles. The spacing agent is attached onto the surface of the toner particles and can be attached by electrostatic forces or physical means or both. With mixing, preferably uniform mixing is preferred and achieved by such mixers as a high energy Henschel-type mixer which is sufficient to keep the spacing agent from agglomerating or at least minimizes agglomeration. Furthermore, when the spacing agent is mixed with the toner particles in order to achieve distribution on the surface of the toner particles, the mixture can be sieved to remove any agglomerated spacing agent or agglomerated toner particles. Other means to separate agglomerated particles can also be used for purposes of the present invention.

The preferred spacing agent is silica, such as those commercially available from Degussa, like R-972, or from Wacker, like H2000. Other suitable spacing agents include, but are not limited to, other inorganic oxide particles, polymer particles and the like. Specific examples include, but are not limited to, titania, alumina, zirconia, and other metal oxides; and also polymer particles preferably less than 1 μm in diameter (more preferably about 0.1 μm), such as acrylic polymers, silicone-based polymers, styrenic polymers, fluoropolymers, copolymers thereof, and mixtures thereof.

The invention will further be illustrated by the following examples. They are not intended to be exhaustive of all possible variations of the invention.

The Kao Binder E, a polyester resin, used in the examples below was obtained from Kao Specialties Americas LLC a part of Kao Corporation, Japan. Carboxymethyl cellulose molecular weight approximately 80K was obtained from Sigma-Aldrich, Inc., St. Louis, Mo., as the sodium salt. CMC molecular weight 90K, 250K and 700K, also as sodium salts, were obtained from Acros Organics. The blue pigment used in the Examples of this invention was Blue Lupreton SE 1163 from BASF, which consisted of Pigment Blue 15:3 as a flushed pigment 40% loading dispersed in a linear copolymer of fumaric acid and bisphenol A. Polywax 500, a polyethylene wax was obtained from Baker Petrolite. LUDOX TM™, a colloidal silica, was obtained from DuPont as a 50 weight percent dispersion.

The size and shape of the particles were measured using a Sysmex FPIA-3000 automated particle shape and size analyzer from Malvern Instruments. Samples pass through a sheath flow cell that transforms the particle suspension into a narrow or flat flow, ensuring that the largest area of the particle is oriented towards the camera and that all particles are in focus. The CCD camera captures 60 images every second and these are analyzed in real time. Numerical evaluation of particle shape is derived from measurement of the area of the particle. A number of shape factors are calculated including circularity, aspect ratio and circle equivalent diameter.

The particle size distribution was characterized by a Coulter Particle Analyzer. The volume median value from the Coulter measurements was used to represent the particle size of the particles described in these examples.

The extent of porosity of the particles of the present invention can be visualized using a range of microscopy techniques. Conventional Scanning Electron Microscope (SEM) imaging was used to image fractured samples and view the inner pore structure. The Scanning Electron Microscope (SEM) images give an indication of the porosity of the particles but is not normally used for quantification. The level of porosity of the particles of the present invention was measured using a combination of methods. The outside or overall diameter of the particles is easily measured with a number of aforementioned particle measurement techniques, but determining the extent of particle porosity can be problematic. Determining particle porosity using typical gravitational methods can be problematic due to the size and distribution of pores in the particles and whether or not some pores break through to the particle surface. To accurately determine the extent of porosity in the particles of the present invention a combination of conventional diameter sizing and time-of-flight methods was used. Conventional sizing methods include total volume displacement methods such as Coulter particle sizers or image based methods such as the Sysmex FPIA3000 system. The time-of-flight method used to determine the extent of porosity of the particles in the present invention includes the Aerosizer particle measuring system. The Aerosizer measures particle sizes by their time-of-flight in a controlled environment. This time of flight depends critically on the density of the material. If the material measured with the Aerosizer has a lower density due to porosity or a higher density due, for example, to the presence of fillers, then the calculated diameter distribution will be shifted artificially low or high respectively. Independent measurements of the true particle size distribution via alternate methods (e.g. Coulter or Sysmex) can then be used to fit the Aerosizer data with particle density as the adjustable parameter. The method of determining the extent of particle porosity of the particles of the present invention is as follows. The outside diameter particle size distribution is first measured using either the Coulter or Sysmex particle measurement systems. The mode of the volume diameter distribution is chosen as the value to match with the Aerosizer volume distribution. The same particle distribution is measured with the Aerosizer and the apparent density of the particles is adjusted until the mode (D50%) of the two distributions matches. The ratio of the calculated and solid particle densities is taken to be the extent of porosity of the particles. The porosity values generally have uncertainties of +/−10%.

The porous polymer particles of this invention were made using the following general procedure:

Example 1

Preparation of Porous Particles Using CMC

Figure 2:
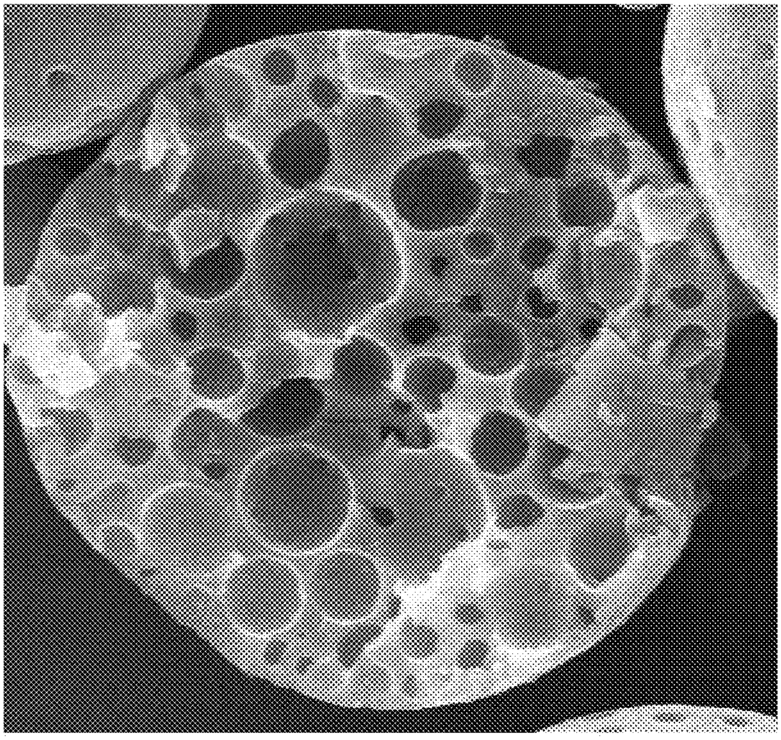
FIG. 2 is an SEM image cross sectional image of a toner particle from Example 11 in accordance with the present invention.

CMC molecular weight 90K (6.25 grams) was dissolved in 125 grams of distilled water. This was dispersed in 340 grams of ethyl acetate containing 85 grams of the Kao E polymer resin for two minutes at 6800 RPM using a Silverson L4R homogenizer fitted with the General-Purpose Disintegrating Head. The resultant water-in-oil emulsion was further homogenized using a Microfluidizer Model #110T from Microfluidics at a pressure of 8900 psi. A 366 g aliquot of the resultant very fine emulsion was dispersed, using the Silverson homogenizer again for two minutes at 2800 RPM, in 900 grams of the second water phase comprising a pH 4 buffer and 4.2 grams of LUDOX TM™, followed by homogenization in a Gaulin colloid mill to form a water-in-oil-in-water double emulsion. The ethyl acetate was evaporated using a Buchi Rotovapor RE120 at 35° C. under reduced pressure. The resulting suspension of beads were filtered using a glass flitted funnel, washed with water several times and dried in a vacuum oven at 35° C. for 16 hours to dry the beads including the water contained in the pores. The volume median particle size was 10.9 micrometers and the porosity was 42 percent. FIG. 2, which is an SEM cross-section of a particle of this Example shows the high level of porosity and the discrete pores stabilized by the CMC. The particles did not show any tendency for brittle failure as demonstrated by the fact that after surface treatment of the particles with a spacing agent such as R972 fumed silica from Degussa using a high energy Henschel-type mixer, the volume median particle size was unchanged at 10.8 micrometers.

Examples 2-4

Control Examples

In Example 2 a particle was made as described in Example 1 but without CMC in the first water phase. The particles did not have any substantial porosity.

In Example 3 non-porous solid particles were made by a conventional ELC, chemical process that shows nearly equivalent PSD between the Aerosizer and Coulter. The particle size was 5.1 and the measured porosity was approximately 4 percent. The 4% adjustment required to match distributions is within the uncertainty of the measurements.

In Example 4 ammonium bicarbonate was used in place of CMC in the first water phase. The resultant porous particle fractured significantly upon isolation as a dry powder.

Example 5

Porous Particles Incorporating Pigment

In this example the particles were prepared as in Example 1 except that CMC molecular weight 80K was used and the organic phase contained 329.94 grams of ethyl acetate, 82.48 g of Kao E polymer resin, and 12.58 g of Lupreton SE 1163. The resultant particles had a porosity of 47% and a volume median particle size of 16.8 microns. After surface treatment with silica as in Example 1 the particle size remained unchanged at 16.8 microns. This demonstrates that the particles did not show any tendency for brittle fracture and that the pigmented particles were porous.

Example 6

Porous Particles Incorporating Pigment and Wax, with Irregular Surface Morphology CMC (14.28 grams, molecular weight 80K) was dissolved in 285.72 grams of distilled water. This was dispersed in an organic phase containing 713.2 grams of ethyl acetate, 132.25 g of Kao E polymer resin, 48.55 g of Lupreton SE 1163, and 77.01 g of a Polywax 500 dispersed in ethyl acetate (solid content 17.4%) for two minutes at 6800 RPM using a Silverson L4R homogenizer fitted with the General-Purpose Disintegrating Head. The resultant water-in-oil emulsion was further homogenized using a Microfluidizer Model #110T from Microfluidics at a pressure of 8900 psi. A 1000 gram aliquot of the resultant very fine water-in-oil emulsion, was dispersed, using the Silverson again for two minutes at 2800 RPM, in 2460 grams of the second water phase comprising a pH 4 buffer and 15.0 grams of LUDOX™ to form a water-in-oil-in-water double emulsion. This mixture was further passed through a Gaulin colloid mill, and upon exiting the homogenization mill, the emulsion was treated with 40 grams of a solution of a shape control agent consisting of an oligomer of methyl aminoethanol and adipic acid where 10 weight percent of the methyl aminoethanol is replaced with benzyl chloride quaternized methyl diethanolamine for controlling the shape of the particle. The ethyl acetate was then evaporated using a Buchi Rotovapor RE120 at 45° C. The resulting suspension of beads were filtered using a glass fritted funnel, washed with water several times and dried in a vacuum oven (~32° C.) for 20 hours to dry the beads including the water contained in the pores.

The particles had a porosity of 40% and a volume median particle size of 18.5 microns, which did not change upon surface treatment as described in Example 1. Further analysis of the particles using a Sysmex Optical Image Analyzer gave the following results:

| Aspect Ratio (W/L) Mean | Aspect Ratio (W/L) SD | Circularity Mean |
|---|---|---|
| 0.760 | 0.188 | 0.968 |

Values of less than unity for aspect ratio and circularity indicate shapes that are not totally spherical. Thus, the use of a shape control agent during the preparation of this toner particle led to irregular surface morphology of the toner, which is desired for transfer and efficient cleaning.

Incorporation of the wax in the porous toner particles without adverse effects on the process shows the possibility of using such toners in a contact roller fusing method without the use of release fluids such as silicone oil.

Example 7

Fusing Characteristics of Porous Toner Particles

Figure 3A:
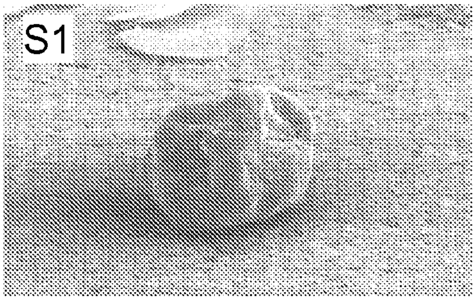
FIG. 3A is an SEM image of an unfused solid toner particle, 3B is an SEM cross sectional image of a fused solid toner particle.
Figure 3B:
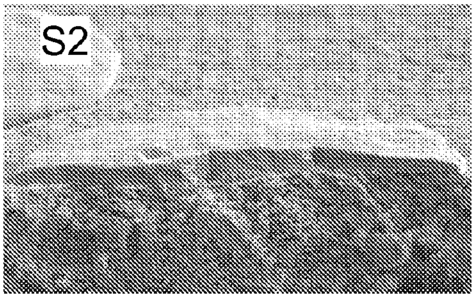
FIG. 3C is an SEM of an unfused toner particle of the present invention, and 3D is an SEM cross sectional image of a fused toner particle of the present invention.
Figure 3C:
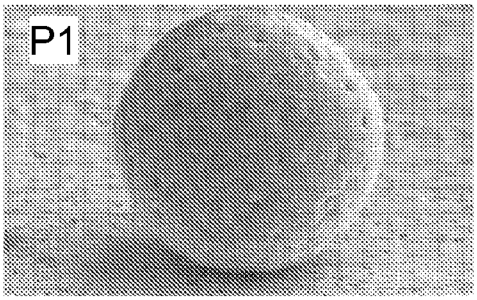
Figure 3D:
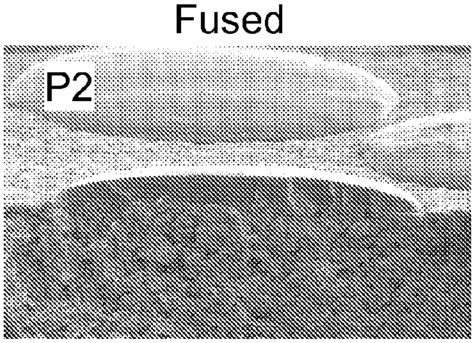

Porous toner particles prepared as in Example 1 were deposited on a coated paper stock and fused with a heat and pressure roller fuser at a temperature of 280° C. and at a speed of 6 inches per second. FIGS. 3A and 3B show SEM images of prior art particles before (left) and after (right) fusing as above. FIGS. 3C and 3D show SEM images of toner particles of the present invention before (left) and after (right) fusing as above. Particles S1 and S2 show typical 8 micrometer solid pulverized toner particles made with a conventional melt compounding and pulverizing process. Particle P1 and P2 show a larger diameter particle (12 micrometer) with greater than 20% porosity fused using identical conditions. The cross section images show that the particles are fused to very nearly the same thickness of ~1.5 micrometers. This shows that a larger diameter porous particle can fuse to the same thickness as a smaller diameter solid particle while providing the potential advantages of a larger particle in terms of toner transfer, cleaning characteristics, and environmental compatibility.

Example 8 and 9

Porous Prepared with Other CMCs

Figure 4:
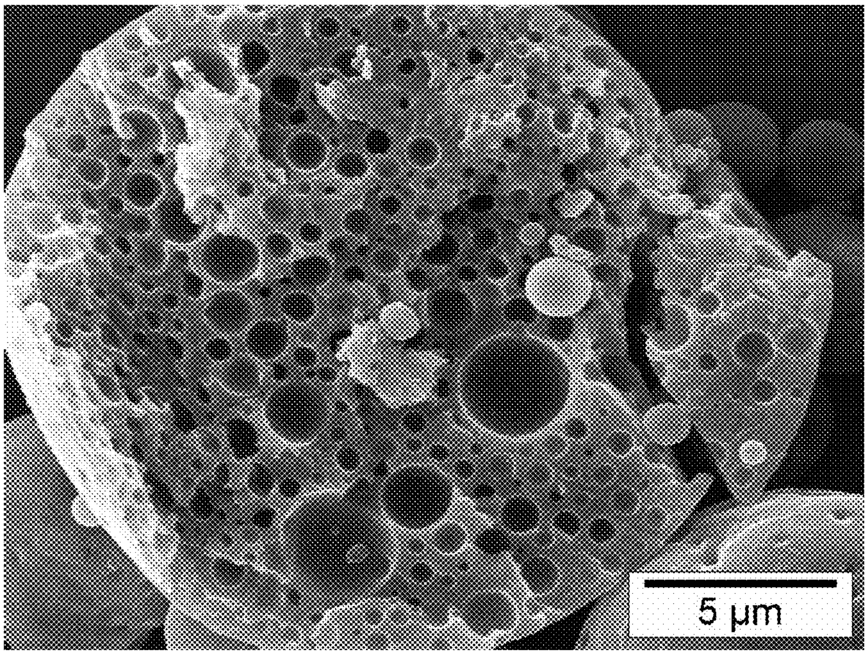
FIG. 4 is an SEM cross sectional image of a toner particle of Example 8 in accordance with the present invention.
Figure 5:
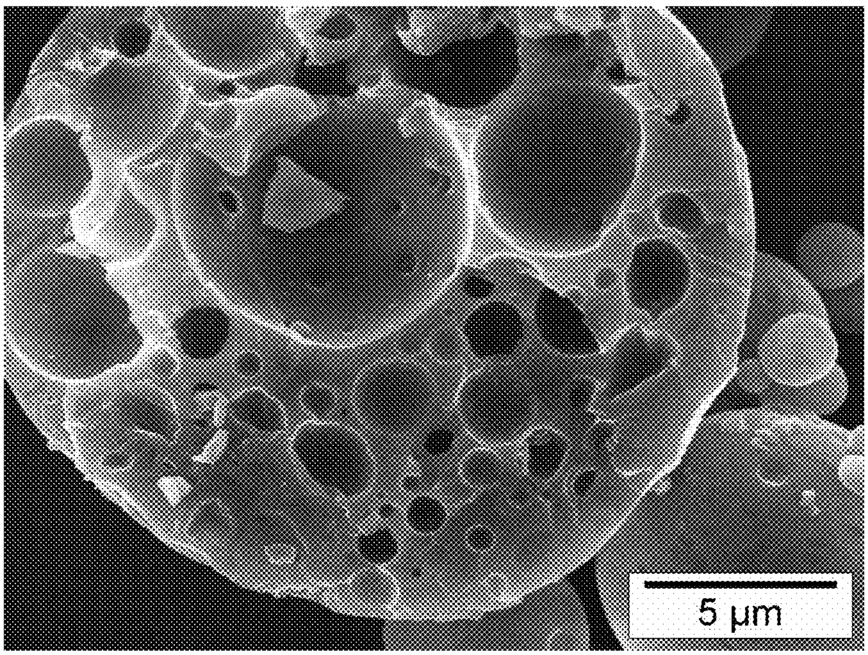
FIG. 5 is an SEM cross sectional image of a toner particle of Example 9 in accordance with the present invention.

Porous particles were prepared as described in Example 1 except in Example 8 CMC MW 250K was used and in Example 9 CMC MW 700K was used. FIGS. 4 and 5 show the SEM cross-sections of particles from Examples 8 and 9 respectively. These examples show that other molecular weight CMCs can also be used to create porosity in the particles.

Example 10

Porous Particles Prepared with Other Hydrocolloids

Figure 6:
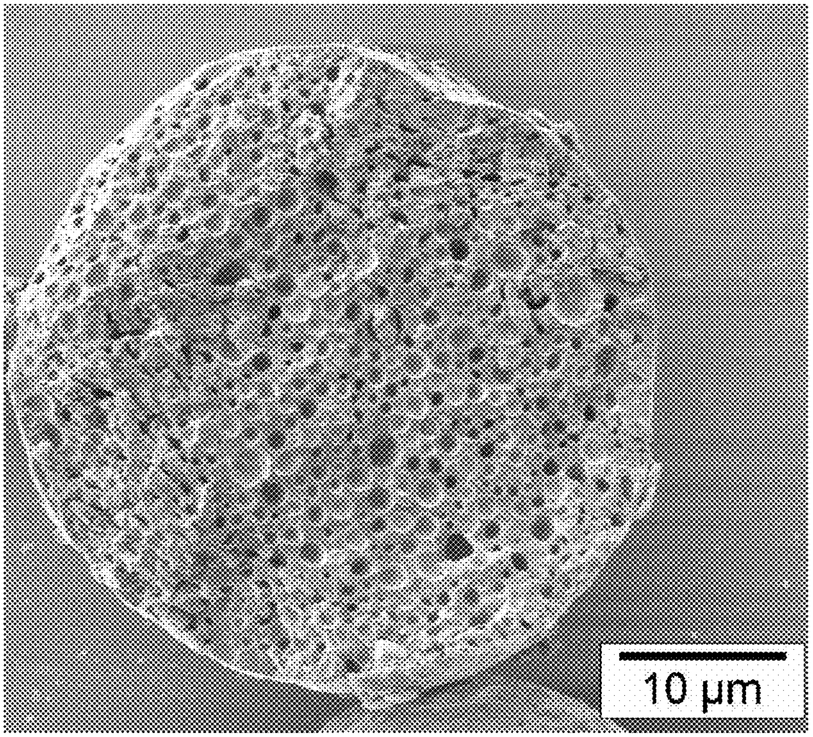
FIG. 6 is an SEM cross sectional image of a toner particle of Example 10 in accordance with the present invention.

In Example 10 gelatin was used in place of CMC and the particles were prepared as in Example 1. FIG. 6 is a cross-section of a particle prepared according to Example 10 and shows porosity and the fact that porous particles can be made using other hydrocolloids.

Example 11

Magnetic Resonance (NMR) Analysis of Porous Particles to Show Presence of CMC

A sample of porous particle as prepared in Example 1 was dissolved in ethyl acetate to remove the Kao E binder polymer, followed by dissolution of the residual CMC in deuterated water. Proton NMR analysis of this solution revealed the presence of CMC in the porous particle. Increasing amounts of CMC incorporated in the particles can be removed by washing the particles with water depending on the extent of washing of the sample based on water temperature and the number of washing steps.

The hydrocolloid in the particle of the instant invention is detectable by magnetic resonance spectroscopic analysis. The amount of hydrocolloid in a particle can be modulated by crosslinking the hydrocolloid in the pores and washing techniques.

The invention has been described in detail with particular reference to certain preferred embodiments thereof, but it will be understood that variations and modifications can be effected within the spirit and scope of the invention.

The invention claimed is:

1. A particle comprising:

a continuous phase comprising a binder polymer, and a second phase comprising discrete pores in the particle stabilized by a pore stabilizing hydrocolloid, wherein the particle has a porosity of at least 10 percent and contains water insoluble particulate stabilizer on the outer surface of the particle.

2. The particle of claim 1 wherein the hydrocolloid is selected from the group consisting of carboxymethyl cellulose (CMC), gelatin, alkali-treated gelatin, acid treated gelatin, gelatin derivatives, proteins, protein derivatives, synthetic polymeric binders, water soluble microgels, polystyrene sulphonate, poly(2-acrylamido-2-methylpropanesulfonate) and polyphosphates.

3. The particle of claim 1 wherein the porosity is from 30 to 70 percent.

4. The particle of claim 1 wherein the hydrocolloid is carboxymethyl cellulose.

5. The particle of claim 1 wherein the binder polymer comprises a polymer formed from vinyl monomers, condensation monomers, condensation esters or mixtures thereof.

6. The particle of claim 1 wherein the binder polymer is selected from the group consisting of polyesters, styrenes, monoolefins, vinyl esters, α-methylene aliphatic monocarboxylic acid esters, vinyl ethers and vinyl ketones.

7. The particle of claim 1 wherein the particulate stabilizer comprises colloidal silica.

8. The particle of claim 1 wherein the particle has a size of from 2 to 50 microns.

9. The particle of claim 8 wherein the porosity is from 30 to 70 percent.

10. The particle of claim 1 wherein the particle comprises an irregular surface morphology.

11. A method of manufacturing porous particles comprising a continuous phase comprising a binder polymer and a second phase comprising discrete pores in the particle stabilized by a pore stabilizing hydrocolloid, wherein the particle has a porosity of at least 10 percent, the method comprising:

providing a first emulsion of a first aqueous phase comprising a pore stabilizing hydrocolloid dispersed in an organic solution containing a polymer dissolved in an organic solvent;

dispersing the first emulsion in a second aqueous phase;

shearing the second emulsion in the presence of a stabilizing agent to form droplets of the first emulsion in the second aqueous phase; and evaporating the organic solvent from the droplets to form porous particles of a controlled size and size distribution.

12. The method of claim 11 further comprising isolating the porous particles.

13. The method of claim 12 further comprising drying the porous particles.

14. The method of claim 11 wherein the polymer comprises a polymer formed from vinyl monomers, condensation monomers, condensation esters and mixtures thereof.

15. The method of claim 11 wherein the dispersing step and shearing step are done simultaneously.

16. The method of claim 11 wherein the hydrocolloid is selected from the group consisting of carboxymethyl cellulose (CMC), gelatin, alkali-treated gelatin, acid treated gelatin, gelatin derivatives, proteins, protein derivatives, synthetic polymeric binders, water soluble microgels, polystyrene sulphonate, poly(2-acrylamido-2-methylpropanesulfonate) and polyphosphates.

17. The method of claim 11 wherein the first aqueous phase further comprises buffering salts.

18. The method of claim 11 wherein the stabilizer comprises colloidal silica.

19. The method of claim 11 wherein the organic solvent comprises ethyl acetate, propyl acetate, chloromethane, dichloromethane, vinyl chloride, trichloromethane, carbon tetrachloride, ethylene chloride, trichloroethane, toluene, xylene, cyclohexanone or 2-nitropropane.

20. The method of claim 11 wherein prior to evaporating the organic solvent, water is added to the second emulsion.

* * * * *